US006934720B1

(12) United States Patent
Jacobs et al.

(10) Patent No.: US 6,934,720 B1
(45) Date of Patent: Aug. 23, 2005

(54) AUTOMATIC INVALIDATION OF CACHED DATA

(75) Inventors: Lawrence Jacobs, Redwood City, CA (US); Xiang Liu, San Mateo, CA (US); Jesse Anton, San Francisco, CA (US); Thorsten Lockert, Los Gatos, CA (US)

(73) Assignee: Oracle International Corp., Redwood Shores, CA (US)

( * ) Notice: Subject to any disclaimer, the term of this patent is extended or adjusted under 35 U.S.C. 154(b) by 423 days.

(21) Appl. No.: 09/922,617

(22) Filed: Aug. 4, 2001

(51) Int. Cl.[7] .............................................. G06F 17/30
(52) U.S. Cl. ....................... 707/200; 707/201; 707/202; 707/203; 707/204; 707/205
(58) Field of Search .......................... 707/10, 200–205, 707/206; 708/229; 711/105, 118–124, 141, 711/154; 705/26, 27

(56) References Cited

U.S. PATENT DOCUMENTS

| 5,611,049 | A   |   | 3/1997  | Pitts                        |
|-----------|-----|---|---------|------------------------------|
| 5,802,582 | A   | * | 9/1998  | Ekanadham et al. ..... 711/152 |
| 6,026,413 | A   | * | 2/2000  | Challenger et al. ..... 707/202 |
| 6,029,175 | A   |   | 2/2000  | Chow et al.                  |
| 6,085,234 | A   |   | 7/2000  | Pitts et al.                 |
| 6,151,643 | A   | * | 11/2000 | Cheng et al. ............ 710/36 |
| 6,275,908 | B1  | * | 8/2001  | Arimilli et al. ......... 711/146 |
| 6,408,360 | B1  | * | 6/2002  | Chamberlain et al. ..... 711/124 |
| 6,415,270 | B1  | * | 7/2002  | Rackson et al. .......... 705/37 |
| 6,460,122 | B1  | * | 10/2002 | Otterness et al. ........ 711/154 |
| 6,578,113 | B2  | * | 6/2003  | Krishnamurthy et al. ... 711/141 |
| 6,584,548 | B1  | * | 6/2003  | Bourne et al. ........... 711/134 |

OTHER PUBLICATIONS

Candan, et al., Enabling Dynamic Content Caching for Database-Driven Web Sites. ACM SIGMOD 2001 May 21-24, Santa Barbara, CA, Copyright 2001 ACM.

Challenger, et al., A Scalable System for Consistently Caching Dynamic Web Data. IBM Research, Yorktown Heights, NY.

Challenger, et al., A Publishing System for Efficiently Creating Dynamic Web Content. IBM Research, Yorktown Heights, NY.

Datta, et al., A Comparative Study of Alternative Middle Tier Caching Solutions to Support Dynamic Web Content Acceleration. Proceedings of the 27th VLDB Conference, Roma, Italy, 2001.

Degenaro, et al., A Middleware System Which Intelligently Caches Query Results. IBM Research, Yorktown Heights, NY, Copyright 2000, Springer-Verlag.

Wessels, et al., ICP and the Squid Web Cache, pp. 1-25, Aug. 13, 1997.

(Continued)

*Primary Examiner*—Shahid Alam
*Assistant Examiner*—Cam Y T Truong
(74) *Attorney, Agent, or Firm*—Park, Vaughan & Fleming LLP (57) ABSTRACT

A system and method are provided for automatically invalidating cached data. A cache system caches data from a data server (e.g., web server, application server, database). When a request is received at the cache system from a client, particularly a request to alter or replace a set of data, the request is examined and may be compared to a set of rules or data relationships that invoke automatic invalidation. Based on a pattern or content of the request (e.g., an identifier of data to be changed), the cache system identifies and invalidates a cached data item without waiting for the data server to receive the request, process it and instruct the cache system to invalidate the data item. In a cache system comprising multiple caches, one cache may notify another when automatic invalidation is necessary.

20 Claims, 2 Drawing Sheets

OTHER PUBLICATIONS

Wessels, et al., Internet Cache Protocol (ICP), version 2, pp. 1-9, National Laboratory for Applied Network Research/UCSD, Sep. 1997.

Kawai, et al., A Quantitative Analysis of ICP Queries at the Distributed WWW Caching System. www.isoc.org/isoc/conference/inet/99/proceedings/4n/4n 2.htm, Aug. 14, 2002.

Akami white paper: Turbo-Charging Dynamic Web Sites with Akami EdgeSuite, pp. 1-16. www.akamai.com, Sep. 23, 2002. Copyright 2001, Akamai Technologies, Inc.

A Distributed Infrastructure for e-Business-Real Benefits, Measurable Returns, pp. 1-28. www.akamai.com, Sep. 23, 2002. Copyright 2000 and 2001, Akamai Technologies, Inc.

Edge Sides Includes (ESI) Overview, pp. 1-7, www.esi.org, Sep. 23, 2002. Copyright 2001, Oracle Corporation, Akamai Technologies, Inc.

Tsimelzon, et al., Edge Sides Includes ESI-Accelerating E-Business Applications: Language Specification 1.0, pp. 1-12. www.esi.org/language spec 1-0.html, Sep. 23, 2002. Copyright 2001, Akamai Technologies, Oracle Corporation.

Nottingham, et al., Edge Side Includes ESI-Accelerating E-Business Applications: Edge Architecture Specification, pp. 1-6. www.esi.org/architecture spec 1-0.html, Sep. 23, 2002. Copyright 2001, Akamai Technologies, Oracle Corporation.

Jacobs, et al., Edge Side Includes ESI-Accelerating E-Business Applications: ESI Invalidation Protocol 1.0, pp. 1-13. www.esi.org/invalidation_protocol_1-0.html, Sep. 23, 2002. Copyright 2001, Oracle Corporation.

Basu, et al., Edge Side Includes ESI-Accelerating E-Business Applications: JESI Tag Library 1.0 Specification: Tags for Edge-Side Includes in JSP, pp. 1-19. www.esi.org/jesit tag lib 1-0.html, Sep. 23, 2002. Copyright 2001, Oracle Corporation, Akamai Technologies, Inc.

Mailing list posting entitled "Re: POST vs. separate methods," Oct. 29, 1996.

* cited by examiner

AUTOMATIC INVALIDATION OF CACHED DATA

BACKGROUND

This invention relates to the fields of computer systems and data management. More particularly, a system and methods are provided for automatically invalidating a cached data item.

In many computing environments, data desired by users or clients may be cached in order to provide faster response to the users' data requests. Thus, a typical environment may include users or clients operating browsers or other user interfaces to request data stored on a database or web server, and a cache system interposed between the users and the data server. A subset of the data stored on the data server is cached in the cache system. In this environment, data requests may be intercepted or routed to the cache system. If a user's desired data is stored in the cache, the request may be satisfied from there, thereby avoiding the time and expense of passing the request to the data server and waiting for the desired data to be returned.

Data that is cached may be updated or replaced as the original or master version stored on the server is modified or replaced. Typically, when data on the server is changed (e.g., by a user), the server invalidates the corresponding data on the cache system by sending the cache system an invalidation message identifying the obsolete data. Thus, even though the cache system may have received the user's data change, and passed it to the server, an additional communication must be sent back to the cache system from the server in order to invalidate the data. This was necessary because, traditionally, only the data server was configured with the requisite intelligence and capability to apply the side effects (e.g., data invalidation) of user activities. Until the server's invalidation message is received and applied, there is the possibility that invalid data may be served from the cache system.

SUMMARY

Thus, in one embodiment of the invention a system and methods are provided for automatically invalidating a data item in a cache. In this embodiment, when a cache system receives a data update or replacement from a user or other source, and the cache system is caching a related data item, it will automatically invalidate the related data item without waiting for an invalidation message from a server. In a cache system comprising multiple caches (e.g., a cache cluster or partitioned cache), a cache that receives the update/replacement may notify one or more other caches so that appropriate data items are invalidated.

In one implementation of this embodiment, a cache system caches data items (e.g., web page content), of which master versions are stored on a data server (e.g., database, web server, application server). The data items may relate to products offered for sale or auction. In this implementation, a product may be identified by an item number or other identifier, which is included in a communication from a user (e.g., the user's browser) when the user wishes to view product information, make a purchase, submit a bid, etc. Thus, if a user submits a bid on an auction item, for example, the cache system receives the bid, identifies the item from its identifier included in the bid, identifies the cached data relating to the item (e.g., old bid price) and invalidates that cached data.

In one embodiment of the invention, the cache system is configured to identify relationships between data items, such that a change or other activity regarding one causes the automatic invalidation of the other. Alternatively, the cache system may be configured with rules for automatic invalidation of cached data. Such rules may, for example, identify patterns or templates for comparison with user activity (e.g., view requests, data change requests) and, if a match is found, one or more specified data items are automatically invalidated (if stored in the cache).

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and methods are provided for automatically invalidating cached data. In particular, one or more data items cached in a cache system may be automatically invalidated when data is altered or replaced. In this embodiment, the cache system is configured with the appropriate rules or relationships for invalidating data. The cache system therefore does not need to wait for a data server to apply a rule or relationship and instruct the cache system to invalidate a cache entry. The cached data to be invalidated may represent a previous version of the changed/replacement data, or may have some other relationship with it.

For example, in an implementation of this embodiment for an electronic auction system, a bid on an item may cause a previous price, if cached, to be invalidated. Or, in an electronic commerce environment, when a user modifies his or her shopping cart (e.g., by adding or removing an item), a cached version of the shopping cart could be automatically invalidated.

In different embodiments of the invention, one data change/replacement may be sufficient to cause the automatic invalidation of one or more cached data items, or multiple changes/replacements (e.g., a particular sequence) may be needed to invalidate one or more cached items. Also, a data change/replacement may trigger an automatic invalidation even if the change or replacement only potentially (vice actually) invalidates a data item.

In addition, the automatic invalidation could be selective. If, for example, multiple versions of a data item are cached (e.g., in different languages, with different branding, for users at different network addresses), a particular data change/replacement may cause the automatic invalidation of only a subset of the multiple versions.

In a cache system comprising multiple caches (e.g., a partitioned cache, a cache cluster), a cache that receives user activity sufficient to cause automatic invalidation may notify (e.g., via broadcast, multicast, unicast) other caches of the action.

As one skilled in the art will appreciate, a cached data item that is automatically invalidated may not be refreshed, replaced or repopulated until a subsequent request for the data item is received. This may differ from, and be more efficient than, a replication scheme of storing or maintaining data, wherein an invalidated data item may be automatically replaced. Automatic replacement of a large number of data items when not specifically needed or requested may be inefficient.

Figure 1:
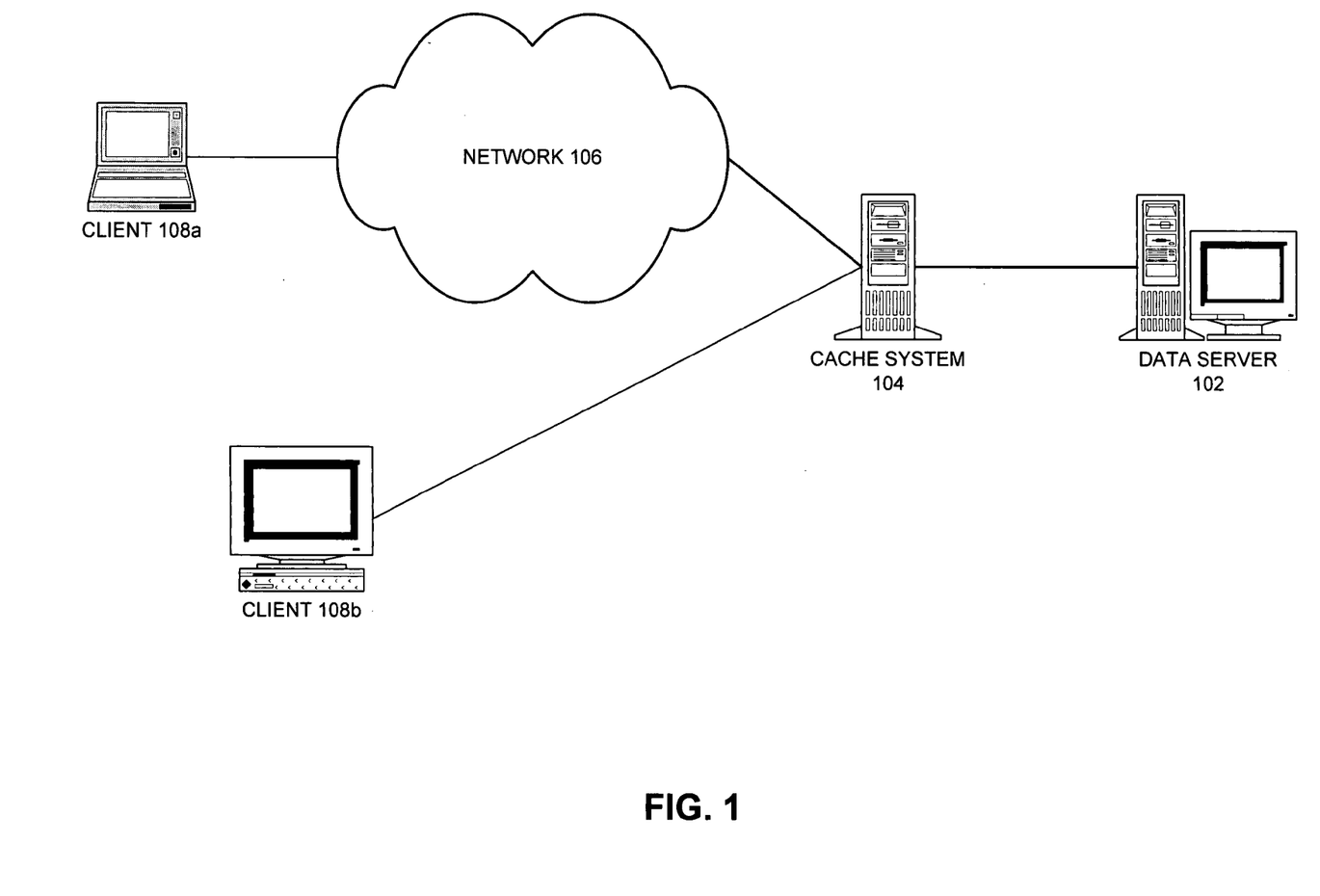
FIG. 1 is a block diagram depicting an illustrative computing environment in which an embodiment of the present invention may be implemented.

FIG. 1 depicts an illustrative computing environment in which cached data may be automatically invalidated, according to one embodiment of the invention. The cached data that is invalidated may be any type of data that a cache may store, such as a web page, a portion of a web page, data from a database, etc. The data may comprise text, graphics, audio, multimedia, etc. As described above, multiple cache entries may be invalidated at a time, and the entries may be of the same or different types or compositions of data.

In FIG. 1, data server 102, which may be a web server, application server, database server, etc., stores data that may be served to clients 108a, 108b. Clients 108a, 108b may comprise any type of computing device capable of communication with another computing device. Clients 108a, 108b may therefore comprise desktop, workstation, portable or hand-held devices, or suitably equipped communication devices (e.g., web-enabled telephones). The clients may further, or alternatively, comprise browsers or other user interfaces operated on such computing devices.

Cache system 104 caches data stored on server 102 for faster serving to clients. Cache system 104 is coupled to clients 108a, 108b via any suitable communication links, such as network 106 (which may be the Internet) or a direct link. Although data server 102 and cache system 104 are depicted as separate computers in FIG. 1, in an alternative embodiment of the invention a cache system may perform automatic invalidation even when it resides on the same computer system as the data server. Further, cache system 104 may be implemented as a cache cluster, a partitioned cache, or some other cooperative collection of caches, which may be geographically or logically dispersed within a LAN, WAN or other communication network.

In an embodiment such as that of FIG. 1, clients initiate various actions regarding data stored on server 102 and/or cache system 104. Illustratively, a client may submit a view request to gain access to a particular data item (e.g., web page, price or description of an item, icon or graphic) or a change request to change or replace a data item (e.g., add an item to a shopping cart, bid on an auction item, revise a piece of text). Illustratively, a "change request" herein includes any activity or request received by a cache system that may instigate or require the invalidation of cached data. Client requests may be received via http (Hypertext Transport Protocol), ftp (File Transfer Protocol) or other suitable protocol.

View requests are received or intercepted by, or routed to, cache system 104, where they are examined to identify the requested data. If a requested data item is cached in the cache system, the cache system may serve the data item to the requesting client. This avoids the time and cost of retrieving the data item from server 102.

If cache system 104 receives a view request for a data item that is not cached or is invalid, the cache system may forward the request to server 102. Server 102 processes the view request, identifies the requested data, and passes it to cache system 104, which caches it and serves it to the client.

When a change request is received at cache system 104, the cache system processes the request as described below and may notify or forward the change to server 106 so that the appropriate data changes/replacements are made on the data server. As one skilled in the art will appreciate, in a system lacking the benefit of an embodiment of the invention, data server 102 would normally, after implementing a requested data change for data cached on cache system 104, send a communication or message back to the cache system to tell the cache system to invalidate the old version of the changed/replaced data item. Initiating and sending invalidation messages consumes server resources and, in a busy system, may be done very frequently. Similarly, the cache system must receive and process each invalidation message, which also consumes resources. And, if a data item is not invalidated fast enough, the cache system may serve it to a client without knowing that it has become invalid, stale or obsolete.

In accordance with one embodiment of the invention, however, when a change request is received at cache system 104, the cache system parses or examines the request and may automatically invalidate cached data without waiting for instructions from server 102. The cache system may apply a set of specified rules or relationships to determine if automatic invalidation is necessary.

The cache system may examine various contents of the request, such as a URI (Uniform Resource Identifier) or other identifier of the data the client is changing or replacing, a cookie received with the request, parameters or qualifiers embedded in the change request, various fields or pieces of information for the protocols used to submit or carry the request, etc. The cache system may thus consider the client's agent (e.g., type of browser), network address, language, etc.

In one embodiment of the invention, the cache system refers to a collection of rules or relationships between data items, requests, request patterns, etc., for determining when cached data is to be invalidated. In particular, the cache system may maintain a set of rules or data relationships that are applied to determine if and when cached data should be automatically invalidated, and to identify the data to be invalidated. Thus, a rule may require that when a request matches a particular pattern or includes (or identifies) particular content, that a particular cached data item is to be invalidated.

For example, in an electronic auction system that implements an embodiment of the invention, a change request may comprise a bid on an auction item. Based on a known relationship between the bid and the price of the auction item, the cache system's invalidation rules may be set to automatically invalidate the previous price of the item if it is cached. Thus, in this example the cache system examines the change request (i.e., the bid), determines that it is a bid (e.g., based on the pattern or content of the request), determines that a rule applies to the request, extracts an identifier of the auction item from the request, and applies the rule to invalidate a cache entry comprising the previous price of the item. The rule may, for example, provide a template with which to identify the data to be invalidated. In this case, the data item identifier extracted from the bid may be plugged into the template to find and invalidate the appropriate data.

As one skilled in the art may appreciate, a present embodiment of the invention may thus be configured to apply intelligence normally residing at, and applied on, a data server. More specifically, traditional data servers may contain business logic or application or other programming that allows the server to recognize, based on some data activity or request, when a set of data becomes obsolete, stale or invalid. In an embodiment of the invention, some of that intelligence is applied to a cache system.

The rules or relationships to be applied by a cache system to automatically invalidate cached data may be determined or supplied by an operator, administrator or other entity. For example, an interface may be provided to allow an administrator to specify a pattern or model of a client request that will cause a data item to be automatically invalidated, and to identify the data item(s) to be invalidated. Each time the cache system is booted or initialized, it may load the rules as part of its initialization procedure. In one alternative embodiment, the rules or relationships may be coded into the cache system.

Figure 2:
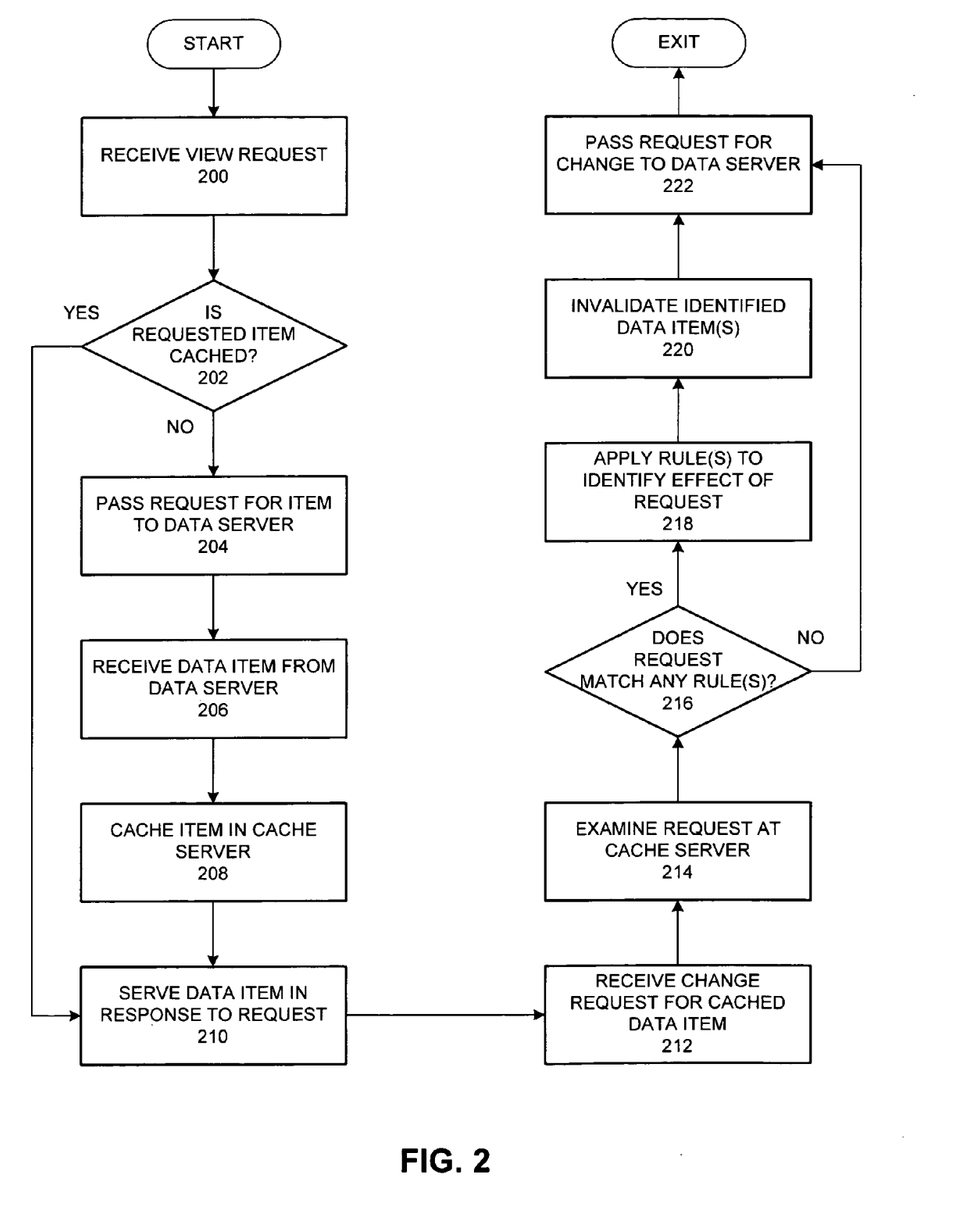
FIG. 2 is a flowchart illustrating one method of automatically invalidating cached data in accordance with an embodiment of the invention.

FIG. 2 demonstrates an illustrative method of automatically invalidating cached data in accordance with one embodiment of the invention. In this method, a cache system is configured to cache data from a data server and serve it in response to clients' view requests—requests to view or access data (e.g., web pages, product information). The cache system is also configured to automatically invalidate cached data if a client request to change data (a "change request") satisfies an invalidation rule enforced by the cache system.

In state 200, a view request is received, from a client, at the cache system. Illustratively, the client may have been browsing an organization's web site and selected or requested access to a product description or other information, may have entered an auction site and wishes to see a current bid price for an item, etc. The view request, which may be received via http (HyperText Transport protocol) or another suitable protocol, may include a URI similar to the following:

www.xyzzy.com/viewItem?ItemNo=123

In state 202, the cache system determines whether the requested data item (e.g., price or product description for item number 123) is cached. The cache system may first identify the request as a view request, possibly by parsing the request and extracting the "viewItem" string, and then search its cache index or entries for a matching item. Or, the cache system may simply attempt to match the URI string against cached data items. If a matching data item is found in the cache, the illustrated procedure advances to state 210; otherwise, the procedure continues at state 204.

In state 204 the cache system passes a request for the desired data item to the data server. The cache system may just forward the client's request, or may initiate a separate request. In state 206 the cache system receives the requested data item from the data server and, in state 208 caches it.

In state 210, the data item is served to the requesting client.

In state 212, a request to change the cached data item is received, from the same or a different client. The change may involve a new price being bid for an auction item, the addition or deletion of a product to/from a client's shopping cart, an update to a story, a replacement stock quote, etc. A change request for the data item cached in state 210 may include a URI similar to the following:

www.xyzzy.com/bidItem?ItemNo=123 and may include other information (e.g., a new bid price, a quantity).

In state 214, the cache system examines the change request, in order to identify it as such, identify the item being bid upon, determine if it requires a data item to be automatically invalidated, etc. In this embodiment of the invention, a "change request" may include any client action, received by the cache system, that may cause a cached data item to be invalidated. It may, in particular, involve a request to alter or replace some data, in which case the altered/replaced data are identified and a cached version of the data, or related data, is invalidated.

One skilled in the art will appreciate that it may be ineffective for the cache system to just compare a URI string from a change request with URIs describing existing cache entries in order to find an entry that should be invalidated, because the URI string of a change request will often differ from a view request for the same or related data. Thus, the cache system may be configured to parse a change request to extract information that can be used to determine if a cached data item should be invalidated and to identify the appropriate cached item.

To determine if a change request invokes any invalidation rules or relationships, the cache system may compare a portion of the request (such as the URI string) to a set of request patterns associated with established rules. In one embodiment of the invention, invalidation rules may be expressed with matching "sources" and "destinations," in which a source identifies a change request, or indicates a pattern of a change request, that will cause the invalidation of a cached data item identified by the destination. In this embodiment, sources and destinations may be expressed as templates applied to clients' requests, as in Example (1):

| | |
|---|---|
| Source1 | = /bidItem?ItemNo=(.*) |
| Destination1 | = /viewItem?ItemNo=$1 |

In this example, the source is a pattern that the cache system will look for in change requests. In Source1, "(.*)" indicates that a value at that position in a matching change request should be extracted. The extracted value may then be used in the corresponding Destination1, in the position marked by "$1". A rule may include multiple sources and/or destinations, and any number of values may be extracted from change requests and/or used to identify data items to be invalidated.

If the rule of Example (1) were applied in an electronic auction system, the cache system would parse each bid request and extract the number or identifier of the item being bid upon, plug that identifier into the string of Destination1, and use it to look up a matching cache entry. If found, the entry is automatically invalidated.

In state 216, the cache system determines if the change request matches any rules or satisfies any known conditions for automatically invalidating a cached data item. If not, the illustrated method proceeds to state 222; otherwise, the process continues at state 218.

In state 218, the matching rule(s) are applied to determine the effect(s) of the received change request (e.g., to identify the cached data items to be invalidated). As described above, this may involve extracting parameters, values, or other information from a change request and inserting them into a template for identifying a data item.

In state 220 the identified data item(s) is/are invalidated if stored in the cache. State 220 may involve notification, from a first cache in a set of clustered, partitioned or other cooperating caches, to one or more of the other caches to notify them of the necessary invalidation. Illustratively, the first cache receives the change request and determines whether any data needs to be invalidated. If so, it notifies one or more other caches. The first cache may, in this scenario, refer to a digest or index to identify a specific cache to be notified, or may send notifications to any combination of the other caches.

In state 222 the cache system notifies the data server of the change request, either by forwarding it or generating a similar notification. The cache system may also indicate to the data server that it has already invalidated appropriate data items. State 222 may, in one alternative embodiment of the invention, be performed substantially simultaneously with states 218–220.

One skilled in the art will appreciate that the method depicted in FIG. 2 is just one method of automatically invalidating a cached data item. Similar methods may be derived from the figure and the accompanying description without exceeding the scope of the invention.

As described above, multiple sources may be matched with one destination and vice versa. Example (2) demonstrates how multiple sources may be applied to identify a data item to be invalidated:

```
SourceURI    = /bidItem?ItemNo=(.*)
SourceIP     = 216.250.*.*
Destination2 = /viewItem?ItemNo=$1 + Region1
```

In Example (2), the cache system matches a URI of a change request against the pattern of SourceURI as in Example (1). Also, however, the cache system determines if the change request originated from a source IP address matching the indicated pattern, which, illustratively, represents an organization's network in Region1 (e.g., a city, state, country). If a pattern of the change request matches SourceURI and is from an address matching SourceIP, then a cached data item matching the pattern of Destination2 and corresponding to Region1 is automatically invalidated.

As shown in Example (2), various information received with a change request, or its accompanying protocol data, may be used to determine if any data should be automatically invalidated and, if so, to identify the item(s).

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of automatically invalidating data cached in a cache system physically separate from a data server configured to originate data to be cache system, the method comprising:
    at a cache system physically separate from a data server configured to originate data to be cached in the cache system, caching a first data item received from the data server for service in response to request to view said first data item;
    receiving at the cache system a change request from a client to alter a data item;
    comparing said change request to a set of rules for determining when to automatically invalidate said first data item;
    identifying a relationship between a second data item and a first data item, wherein said identifying a relationship comprises comparing a pattern of said first request to a first rule for determining when to automatically invalidate a set of data, wherein said first rule comprises a first pattern for identifying a request in response to which a set of data may be automatically invalidated, and further comprises a second pattern, different from said first pattern, to identify said set of data to be automatically invalidated; and
    automatically invalidating said first data item at the cache system in response to said change request.

2. The method of claim 1, wherein said data item to be altered comprises said first data item.

3. The method of claim 1, wherein said automatically invalidating comprises identifying a relationship between said data item to be altered and said first data item.

4. The method of claim 1, wherein said cache system comprises multiple caches and said receiving occurs at a first of the multiple caches, the method further comprising:
    sending a notification of said automatic invalidation from the first cache of the multiple caches to a second cache of the multiple caches.

5. A method of operating a cache system to facilitate automatic invalidation of cached data, the method being performed at the cache system and comprising:
    at a cache system physically separate from a data server configured to originate data to be cached in the cached system, caching a first set of data received from the data server;
    receiving at the cache system a first request from a client to change a second set of data;
    retrieving from said first request an identifier of said second set of data;
    comparing said first request to a set of rules for determining when to automatically invalidate said first set of data;
    identifying a relationship between said second set of data and said first set of data, wherein said identifying a relationship comprises comparing a pattern of said first request to a first rule for determining when to automatically invalidate a set of data, where said first rule comprises a first pattern for identifying a request in response to which a set of data may be automatically invalidated, and further comprises a second pattern, different from said first pattern, to identify said set of data to be automatically invalidated;

automatically invalidating said first set of data in the cache system without awaiting an invalidating communication from the data server.

6. The method of claim 5, wherein said second set of data comprises said first set of data.

7. The method of claim 5, wherein said second set of data is a later version of said first set of data.

8. The method of claim 5, wherein the cache system comprises multiple caches and:
   wherein said caching comprises caching said first set of data at a first cache of the multiple caches; and
   wherein said automatically invalidating is performed at a second cache of the multiple caches;
   the method further comprising notifying the first cache, by the second cache, of said automatic invalidation.

9. A method of automatically invalidating cached data, comprising:
   at a cache system physically separate from a data server configured to originate data to be cached in the cache system, caching a first set of data at a caching system for serving in response to a view request, wherein said view request comprises a request to view said first set of data, and wherein said first set of data is received from a data server;
   receiving at the caching system a change request from a client, wherein said change request comprises a request to change said first set of data;
   identifying said first set of data from said change request;
   identifying a relationship between a second data item and a first data item, wherein said identifying a relationship comprises comparing a pattern of said first request to a first rule for determining when to automatically invalidate a set of data, wherein said first rule comprises a first pattern for identifying a request in response to which a set of data may be automatically invalidated, and further comprises a second pattern, different from said first pattern, to identify said set of data to be automatically invalidated;
   comparing said change request to a set of rules for determining when to automatically invalidate said first set of data; and
   automatically invalidating said cached first set of data without waiting for the data server to implement said change request, wherein invalidating said cached first set of data is in response to the view request.

10. The method of claim 9, wherein said data server is notified of said change request only after said automatic invalidation of said cached first set of data.

11. The method of claim 9, wherein said first set of data comprises a first user's bid on an item being auctioned in an electronic auction, and wherein said change request comprises a second user's bid on said item.

12. The method of claim 9, wherein said first set of data comprises information concerning one or more products at a publicly accessible network location, and wherein said change request comprises a change to said list of products.

13. The method of claim 9, wherein said receiving a change request comprises receiving a sequence of communications matching a predetermined pattern.

14. A computer readable storage medium storing instructions that, when executed by a computing device, cause the computing device to perform a method of operating a cache system to facilitate automatic invalidation of cached data, the method being performed at the cache system and comprising:

at a cache system physically separate from a data server configured to originate data to be cached in the cache system, caching a first set of data received from the data server;
receiving at the cache system a first request from a client to change a second set of data;
retrieving from said first request an identifier of said second set of data;
comparing said change request to a set of rules for determining when to automatically invalidate said first set of data;
identifying a relationship between said second set of data and said first set of data, wherein said identifying a relationship comprises comparing a pattern of said first request to a first rule for determining when to automatically invalidate a set of data, where said first rule comprises a first pattern for identifying a request in response to which a set of data may be automatically invalidated, and further comprises a second pattern, different from said first pattern, to identify said set of data to be automatically invalidated;
automatically invalidating said first set of data in the cache system without awaiting an invalidation communication form the data server.

15. A computer readable storage medium storing instructions that, when executed by a computing device to perform a method of automatically invalidating cached data, the method comprising:
   at a cache system physically separate from a data server configured to originate data to be cached in the cache system, caching a first set of data at a caching system for serving in response to a view request, wherein said view request comprises a request to view said first set of data, and wherein said first ser of data is received from a data server;
   receiving at the caching system a change request from a client, wherein said change request comprises a request to change said first set of data;
   identifying said first set of data from said change request;
   comparing said change request to a set of rules for determining when to automatically invalidate said first set of data;
   identifying a relationship between a second set of data and said first set of data, wherein said identifying a relationship comprises comparing a pattern of said first request to a first rule for determining when to automatically invalidate a set of data, where said first rule comprises a first pattern for identifying a request in response to which a set of data may be automatically invalidated, and further comprises a second pattern, different from said first pattern, to identify said set of data to be automatically invalidated;
   automatically invalidating said cached first set of data without for the data server to implement said change request, wherein invalidating said cached first set of data is in response to the view request.

16. A cache system configured to automatically invalidate cached data, comprising:
   a first cache configured to cache data received from a data server, wherein said first cache is separate from said data server, and wherein the data server is coupled to the cache system via a network link;
   a data service module configured to server a first set of cached data in response to a first data view request from a client;

a set of rules for determining when said first set of cached data is to be automatically invalidated in response to a data change request;

a comparing module for comparing said first data change request to the set of rules for determining when to automatically invalidate said first set of cached data;

identifying a relationship between a second set of data and said first set of data, wherein said identifying a relationship comprises comparing a pattern of said first request to a first rule for determining when to automatically invalidate a set of data, where said first rule comprises a first pattern for identifying a request in response to which a set of data may be automatically invalidated, and further comprises a second pattern, different from said first pattern, to identify said set of data to be automatically invalidated;

an invalidation module configured to automatically invalidate said first set of cached data when a first data change request is received from a client;

wherein said automatic invalidation is performed at the cache system before the data server is notified of said first data change request.

17. The cache system of claim 16, wherein said first cache comprises said invalidation module.

18. The cache system of claim 16, further comprising a user interface configured to facilitate the creation of one of said rules.

19. The cache system of claim 16, wherein said first data change request comprises a predetermined sequence of communications.

20. The cache system of claim 16, further comprising:

a second cache;

wherein said second cache is notified by said first cache of said automatic invalidation.

* * * * *

UNITED STATES PATENT AND TRADEMARK OFFICE
CERTIFICATE OF CORRECTION

PATENT NO. : 6,934,720 B1 Page 1 of 1
DATED : August 23, 2005
INVENTOR(S) : Lawrence Jacobs et al.

It is certified that error appears in the above-identified patent and that said Letters Patent is hereby corrected as shown below:

<u>Column 8,</u>
Line 57, please delete the symbol ";" and replace with the symbol -- ; and --.

<u>Column 10,</u>
Line 24, please delete the word "form" and replace with the word -- from --.
Line 35, please delete the word "ser" and replace with the word -- set --.

Signed and Sealed this

Eighteenth Day of October, 2005

JON W. DUDAS
*Director of the United States Patent and Trademark Office*